Feb. 7, 1928.
S. B. McCLUSKEY
1,658,249
PROCESS AND APPARATUS FOR CYANIDING ORES CONTAINING PRECIOUS METALS
Filed Oct. 8, 1926
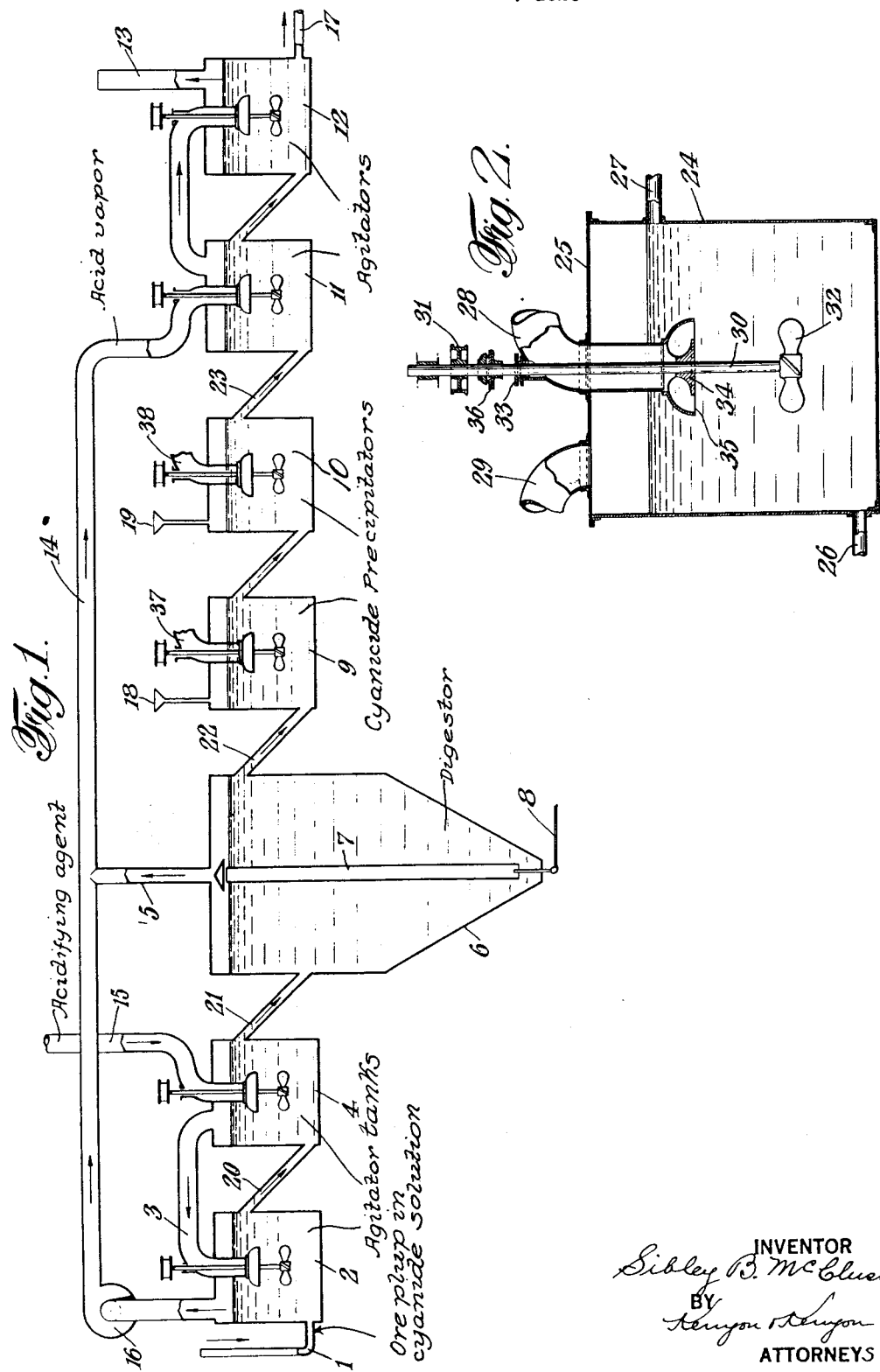
INVENTOR
Sibley B. McCluskey
BY
Kenyon & Kenyon
ATTORNEYS

UNITED STATES PATENT OFFICE.

SIBLEY B. McCLUSKEY, OF FRESNILLO, MEXICO.

PROCESS AND APPARATUS FOR CYANIDING ORES CONTAINING PRECIOUS METALS.

Application filed October 8, 1926. Serial No. 140,396.

My invention relates to a process of and apparatus for the recovery of silver, gold and similar precious metals from the ores thereof, including those ores in which the precious metals are mixed or united with other and less valuable metals such as iron, manganese. and the like. The invention contemplates the use of the cyanide process for obtaining the desired precious metal in a pure state, and has particular application to the conversion of the gangue and salts or oxides of other metals into such form that they will not hinder the direct solution of the precious metal from the pulp by means of cyanide or cause such losses of cyanide from the solution in the form of gas or otherwise as would make the process commercially unprofitable.

It has heretofore been known that silver, gold, and similar precious metals may be dissolved and thus removed from their ores in the form of argento- or auro-cyanides of potassium by means of the use of a solution of potassium cyanide or similar salt, and this has been recognized as one of the most important methods of recovery of these metals from their ores. The process has, however, been limited in its application by the fact that in certain classes of silver and gold ores there is present a considerable percentage of base metals. such as iron, manganese or the like, which react with the cyanide solution to form substances which either combine chemically with the silver and gold, or cause filming thereof, so that the effectiveness of the extraction of precious metals is reduced to such an extent as to make the operation commercially unprofitable. In addition, these base metals are often present in the ore in a state of lower valence and therefore have a reducing effect upon substances brought into molecular contact with them. This reducing effect prevents the formation of the desired argento- and auro-cyanide salts of potassium. Furthermore, these base metals and certain of their salts may cause the formation of hydro-cyanic acid, on acidification of the solution, which escapes as a gas, and thus valuable cyanide is lost. For the reason that these base metals and many of their salts have the effect, as stated, of tending to oppose the economical and efficient separation of the precious metals from the ore by the cyanide process, they have been called, and will hereafter be referred to as, "cyanicides".

It has been heretofore known that, after an ore of a precious metal containing one or more of the base metals described above is ground with water to a finely-divided pulp, sulphur dioxide gas bubbled through this pulp will acidify it to an extent sufficient to dissolve all or most of the manganese and iron contained therein in the form of the soluble sulphite salts thereof. This method has been proposed as a means of removing the manganese and iron from the pulp, in order that when they are removed cyanide solution may be introduced without fear of the deleterious effect caused by the presence of cyanicides. A serious difficulty with this method of dealing with cyanicides is that silver and, to a less extent, gold are partially brought into solution by the sulphur dioxide, and thus a portion of the precious metals is dissolved with the manganese and iron, and passes through the filter with the soluble salts of these metals and may only be recovered by subsequent chemical processes which have made the cost of this method of dealing with cyanicides prohibitive. Another difficulty with this method is that a preliminary filtration is required, in order to separate the soluble sulphite salts from the pulp prior to the introduction of the cyanide solution, and prior to the filtration required after cyanidation, a step which has proven a source of expense tending to make the process commercially impracticable.

It is one of the advantages of my invention that but a single filtration is necessary from the time the ore is ground till a clear solution of potassium argento- and/or auro-cyanide solution is produced, thereby dispensing with the necessity of one or more preliminary filtrations heretofore regarded as essential in the cyanide treatment of ores of this type. It is a further advantage that the sulphur dioxide treatment may be utilized without the ensuing loss of precious metals in the filtrate of these preliminary filtrations. It is a further advantage that the cyanide process is operated in such a way that danger to workmen from hydro-cyanic acid gas is substantially eliminated.

Other objects, advantages and novel features of the invention will be apparent from the following specification and accompanying drawings in which Figure 1 is a diagrammatic view of an apparatus suitable for carrying out the process and Figure 2 is a vertical section through an agitator tank.

In accordance with my invention, which may best be described by reference to the accompanying drawing, pulp of an ore of the class hereinabove described which has been ground in cyanide solution and thickened in the usual way is introduced through pipe 1 to the gas tight agitator tank 2 and thence through the pipe 20 to the agitator tank 4. These agitator tanks, more fully hereinafter described, are adapted to permit the introduction of sulphur dioxide or other appropriate acidifying agent through pipe 15 into agitator tank 4 and thus through pipe 3 to agitator tank 2. The sulphur dioxide, upon dissolving in the water of the pulp, forms sulphurous acid. This acid at once liberates hydrocyanic acid gas and attacks the manganese and iron to form manganous and ferrous sulphites. To a certain extent, also, silver and gold are dissolved by the sulphurous acid, but as the ultimate recovery of these metals is to be in a filtrate, this does not represent a loss as in processes heretofore known. Sufficient sulphur dioxide or other acid is added to insure the substantially complete elimination of hydrocyanic acid and the dissolving of substantially all the manganese, iron and similar foreign metals. Excess sulphur dioxide fumes, if any, together with hydrocyanic acid gas and such inert gases as may have initially served to dilute the sulphur dioxide, are exhausted from agitator tank 2 by means of the pump 16, and delivered by this pump to the main bypass conduit 14, more fully hereinafter described. From agitator tank 4, the pulp is passed through pipe 21 to a large digestion agitator or Pachuca tank 6. Into this tank air is forced through pipe 8 into the air lift column 7. In this agitator or tank 6 the introduction of air into the pulp is for a two-fold purpose; first, to oxidize the sulphites present in the pulp to the corresponding sulphates and the ferrous and manganous metals to the ferric and manganic state respectively; and, second, to drive from solution in the pulp that portion of the hydrocyanic acid gas which has not been driven from the solution in agitator tank 2 or 4. The size of agitator 6, the violence of the agitation therein, and the volume of air utilized is so adjusted as to accomplish both these ends and to expel from the agitator through pipe 5 substantially all of the cyanide (in the form of HCN) which had originally been in the pulp at the time of its introduction into agitator tank 2 and had not been removed therefrom by pump 16. The pulp is then removed from agitator 6 through pipe 22 in a condition substantially free from the —CN radical, and consisting of a mixture of insoluble material (including inter alia gangue and most of the silver and gold), soluble material (including inter alia manganic and ferric sulphates, some silver and gold, and the like), and water. Thus constituted, the pulp is passed into agitator tank 9 where precipitation of iron and manganese is commenced. This precipitation may be effected by any of the alkaline hydrates or carbonates, but for commercial reasons the choice would be limited to the cheaper salts, such as calcium carbonate or hydroxide. I prefer to use crude limestone or marble in agitator tank 9 in order to neutralize the excess of free acid and to precipitate the iron. This material, however, will not precipitate manganese, and therefore I pass the pulp into agitator tank 10 where lime may be added in quantities sufficient to precipitate the manganese. The use of two tanks, however, is merely a practical expedient. It is important to note, however, that during the period of precipitation of the iron and manganese salts, it is necessary to carry on continuous agitation with ample volume of air to effect a complete oxidation and to prevent a reversion. For this purpose air-jets 37 and 38 are provided. When the pulp has been completely neutralized, the iron and manganese converted into the form of hydroxide, and thus precipitated in insoluble form, and a sufficient quantity of lime added to make the pulp strongly alkaline, it is then passed through pipe 23 into agitator tank 11. This tank is adapted to permit the reintroduction into the pulp of the mixture of gases contained in the pipe 14, consisting principally of gaseous hydrocyanic acid (HCN), air, a small proportion of sulphur dioxide, and inert gases. At the time the —CN radical is thus restored to the pulp, the latter no longer contains cyanicides of any sort, since the manganese and iron present are now in the manganic and ferric condition, respectively, and therefore do not have a reducing effect upon substances with which they come in contact, and in addition they are in the form of hydroxides which do not in any way retard the effect of cyanide solution upon precious metals. A sufficient excess of alkali is provided to absorb completely all of the hydrocyanic acid gas introduced in agitator tank 11. I prefer to provide a second agitator tank 12 to ensure the certain and complete absorption of the hydrocyanic acid gas. The excess of alkali present likewise neutralizes any acidity caused by absorption of excess sulphur dioxide gas and the presence of air in the mixture of gases introduced into agitator tank 11 ensures the oxidation of any sulphite salts which may be formed as a result of this neutralization. When the cyanide radical is thus restored to the solution in the absence of cyanicides, the precious metals are dissolved in the form of complex cyanide salts in the usual manner, all remaining material occurring in the original ore now being in insoluble form in the pulp. Air and residual inert gases are now removed from agitator tank 12 through the pipe 13 while the pulp may be removed through pipe 17 to the filters.

The pulp thus produced in accordance with my invention contains precious metals in the form of soluble complex cyanides, while all other metals, together with the gangue, are in the form of insoluble hydroxides and oxides. Accordingly, there may be performed at this stage a single filtration which has been found adequate to effect a clean separation of the soluble argento- and auro-cyanide salts of potassium from the residual insoluble oxides, hydroxides and gangue.

In the practice of my invention, it is important that the operations described be carried on in a gas-tight circuit from the time sulphur dioxide is introduced into the pulp until it is delivered to the filters. Moreover, all hydrocyanic acid gas and sulphur dioxide fumes should be eliminated from the pulp in the digestion agitator 6 by means of an excess of air, and it is likewise important that a sufficient excess of alkalinity be provided at the time of the precipitation of the hydroxides in agitator tanks 9 and 10 to ensure adequate and complete absorption of the hydrocyanic acid gas when the latter is reintroduced into the pulp in agitator tank 11. The use of calcium carbonate for the purpose of neutralizing the pulp in agitator tank 9 and precipitating the iron therein, results in the precipitation of a certain percentage of manganic and ferric carbonates, but as neither of these substances is a cyanicide, and both are insoluble, their generation in the pulp is not a hindrance but is an aid to the successful subsequent development of the process.

In Fig. 2 of the drawing which forms a part of this specification, I have disclosed a form of agitator tank which may be used generally for the thorough mixing of a gas with a liquid. In the form here disclosed, however, it is more especially adapted to the introduction of sulphur dioxide or hydrocyanic acid gas into a pulp of the class hereinabove described. This agitator tank comprises a container 24 provided with a cover 25, liquid inlet and outlet pipes 26 and 27, and gas inlet and outlet ducts 28 and 29. A vertical shaft 30, carrying at its upper end a pulley wheel 31 and at its lower end impeller blades 32, is mounted in suitable bearings 33 and 34, and is arranged to lie along the axis of the gas inlet duct 28. A thrust bearing 36 is provided. In operation, the shaft 30 is rotated in such a direction that the impeller blades 32 direct a current of liquid in an upward direction against the incoming current of gas which is injected into the liquid at the point 35. A thorough mixing of liquid and gas is thus accomplished by means of the violent agitation set up at the points of confluence of the currents of liquid and of gas. This agitation I have found sufficient to effect the absorption of gas which forms a part of the process of my invention.

An illustration of the chemical reactions which may take place in my improved process of recovery of precious metals from ores containing cyanicides, using a ferromanganese ore of silver as an example, is as follows:

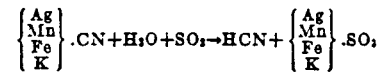

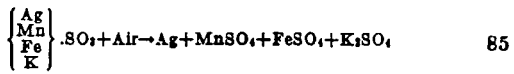

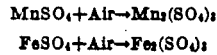

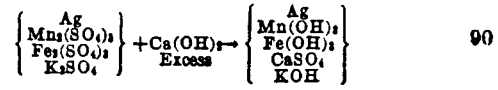

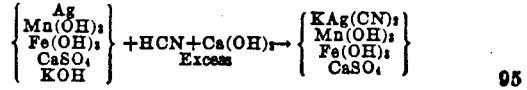

It will be understood that the foregoing description relates only to a preferred mode of carrying out my invention and that many changes, omissions, additions and substitutions may be made in the practice thereof without departing from my invention as defined in the appended claims.

What I claim and desire to secure by Letters Patent of the United States is:

1. In the recovery of precious metals from ore pulp containing cyanicides the process of mixing cyanide with the pulp, acidifying the same, collecting evolved gases, precipitating the cyanicides and then reintroducing the said gases.

2. The process of recovering precious metals from ores thereof which comprises crushing the ore in cyanide solution, expelling hydrocyanic acid gas, precipitating base metals in alkaline solution, and reintroducing the hydrocyanic acid gas.

3. In the process of preparing ores of precious metals for cyanide precipitation, the step of removing cyanicides from the pulp thereof which comprises acidifying the pulp, precipitating base metals in alkaline solution, and reintroducing to the pulp in the presence of an excess of alkali the gases expelled as a result of acidification.

4. As a step in the process of recovering precious metals from ore pulp thereof, introducing air into the pulp for the purpose of expelling hydrocyanic acid gas therefrom and oxidizing ferrous and manganous salts and the like.

5. In the recovery of precious metals from the ores thereof, the step of removing cyanicides from the pulp thereof which includes acidifying the pulp, expelling gases from the pulp during acidification thereof and then reintroducing the said gases into the pulp after alkalinization thereof.

6. The process of separating precious metals from the ores thereof which comprises crushing the ore in cyanide solution to form a pulp, acidifying the same, collecting evolved gases, effecting precipitation and oxidation of base metals and alkalinization of the pulp and reintroducing these gases into the pulp at a subsequent step in the treatment thereof.

7. The process of separating precious metals from the ores thereof which comprises crushing the ore in cyanide solution, expelling substantially all the cyanide from the pulp in the form of hydrocyanic acid gas, precipitating base metals in alkaline solution, and restoring expelled gases to the pulp in the presence of an excess of alkali.

8. The process of separating precious metals from the ores thereof containg cyanicides which comprises crushing the ore in cyanide solution, expelling substantially all the cyanide from the pulp in the form of hydrocyanic acid gas, precipitating the cyanicides in alkaline solution, and restoring expelled gases to the pulp in the presence of an excess of alkali.

9. The process of separating precious metals from the ores thereof containing cyanicides which comprises crushing the ore in cyanide solution, acidifying and aerating the pulp, collecting the evolved gases, precipitating the cyanicides in alkaline solution and reintroducing the said gases into the pulp at a subsequent stage of the treatment thereof.

In testimony whereof, I have signed my name to this specification.

SIBLEY B. McCLUSKEY.